United States Patent [19]

Sone et al.

[11] 4,274,843

[45] Jun. 23, 1981

[54] ELECTROSTATIC TYPE CAR AIR PURIFIER

[75] Inventors: Masazumi Sone, Yokohama; Kazuhiko Suzuki, Yokosuka; Yukitsugu Fukumori, Yokohama, all of Japan

[73] Assignee: Nissan Motor Company, Limited, Yokohama City, Japan

[21] Appl. No.: 56,808

[22] Filed: Jul. 11, 1979

[30] Foreign Application Priority Data

Jul. 19, 1978 [JP] Japan .............................. 53-98328[U]

[51] Int. Cl.³ .......................... B03C 3/32; B60H 3/06
[52] U.S. Cl. ........................................ 55/139; 55/276; 98/2.11
[58] Field of Search .................... 55/102, 139, 276; 98/2.11; 123/148 P; 363/20, 45, 100; 333/12, 167, 177, 181, 172, 185

[56] References Cited

U.S. PATENT DOCUMENTS

| | | | |
|---|---|---|---|
| 1,575,013 | 3/1926 | Slepian | 55/139 |
| 2,140,444 | 12/1938 | Clark | 363/45 |
| 2,241,831 | 5/1941 | Wahlquist | 333/12 |
| 2,449,681 | 9/1948 | Wilson | 55/102 |
| 2,771,586 | 11/1956 | DiToro | 333/12 |
| 3,022,472 | 2/1962 | Tanenbaum et al. | 333/172 |
| 3,148,344 | 9/1964 | Kaufman | 333/172 |
| 3,248,604 | 4/1966 | Richards | 123/148 P |
| 3,273,027 | 9/1966 | Bourgault et al. | 333/172 |
| 3,317,819 | 5/1967 | Brodie | 363/45 |
| 3,593,113 | 7/1971 | Wiley | 333/12 |
| 3,891,914 | 6/1975 | Akita | 363/126 |
| 4,102,654 | 7/1978 | Pellin | 55/102 |

FOREIGN PATENT DOCUMENTS 44-19679 8/1969 Japan ....................................... 55/139
46-37996 11/1971 Japan ....................................... 55/139

OTHER PUBLICATIONS

Richard Dorf, Electronic Organ in Kit Form for Home Construction, Feb. 1965, pp. 23-25.

Primary Examiner—David L. Lacey
Attorney, Agent, or Firm—Lowe, King, Price & Becker

[57] ABSTRACT

An electrostatic type car air purifier comprising a high voltage generating portion, in which a number of tandemly connected resistors of high resistance value are inserted in an output circuit of the generating portion so as to suppress irradiation of electromagnetic noise and to thereby prevent electromagnetic interference in a mounted car radio or other car electric equipment.

1 Claim, 9 Drawing Figures

FIG._1
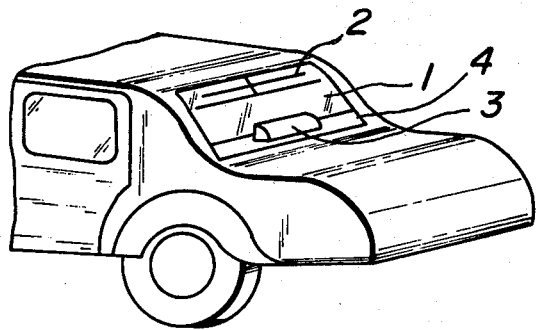
FIG._2a
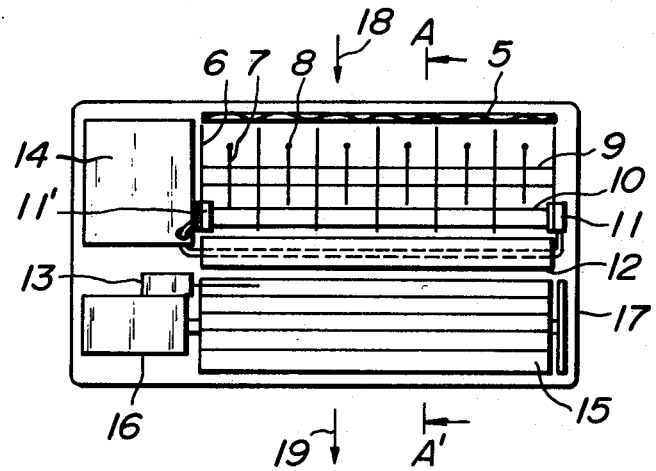
FIG._2b
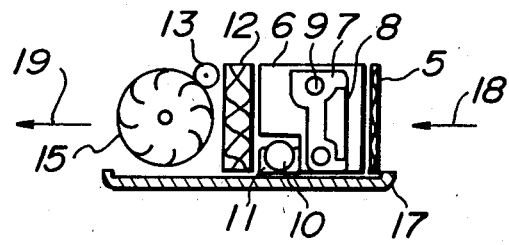

ELECTROSTATIC TYPE CAR AIR PURIFIER

BACKGROUND OF THE INVENTION

1. Field of the Invention

The present invention relates to an electrostatic type car air purifier and more particularly to a very simple electromagnetic shielding mechanism for electromagnetic waves which tend to cause interference in car mounted electric equipment, such as a car radio.

2. Description of the Prior Art

An electrostatic type car air purifier or air purifier for removing floating dust, floating bacteria or cigarette smoke, etc. contained in the air of a motor vehicle cabin and generally for keeping the cabin air pure by further applying sterilization, deodorizing, or adding ions has been used for many years.

Such a known air purifier comprises, for instance, an electrostatic dust collecting portion, an ultraviolet ray sterilizing illuminator, a negative ion generator and fan driving motor. All of these devices are sources of electromagnetic waves which cause noise disturbances for car mounted electric equipment.

Such electromagnetic waves are generally weak in intensity and will not propagate substantially outside the vehicle. The waves may, however, adversely effect for electric or electronic equipment such as a radio mounted in the same vehicle.

This problem is more pronounced for an automotive vehicle as shown in FIG. 1 which comprises an antenna 2 embedded in the rear window glass 1 or provided by printing on the surface thereof. In such type of vehicle, the air purifier 3 is most likely provided on the rear parcel shelf 4 for convenience of air circulation in the cabin so that the antenna 2 and the air purifier 3 are placed very close together but a considerable amount of noise electromagnetic wave may be coupled therebetween.

SUMMARY OF THE INVENTION

The present invention has for its object to mitigate the aforementioned disadvantage of the conventional car mounted electrostatic air purifier of generating electromagnetic interference to car mounted equipment. More particularly, the present invention provides a simple device in an electrostatic type car air purifier that effectively suppresses generation of electromagnetic noise produced from the high voltage generator which operates the negative ion generator and the electrostatic dust collector portion.

DESCRIPTION OF THE DRAWINGS

FIG. 1 is a simplified perspective view showing the location on a car of an air purifier with which the present invention is applied;

FIGS. 2a and 2b show one embodiment of assembly of the air purifier, in which FIG. 2a is plan view of the same and FIG. 2b is a cross-sectional view of the same;

FIG. 3a is a circuit diagram showing one embodiment of the present invention;

FIG. 3b is a circuit diagram showing a modification of the circuit shown in FIG. 3a;

DESCRIPTION OF THE PREFERRED EMBODIMENTS

Figure 3:
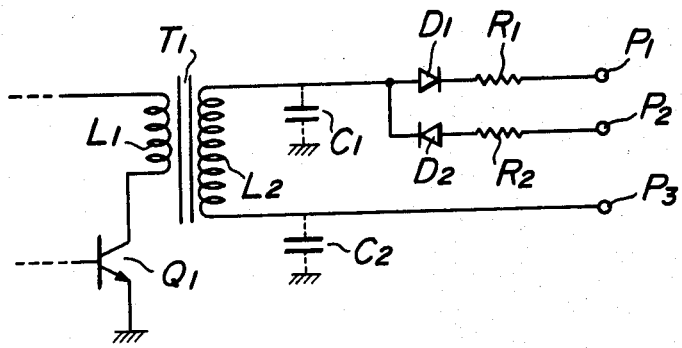

FIGS. 2a and 2b show one embodiment of the air purifier made according to the present invention. FIG. 2a is a plan view in which the lid has been removed. FIG. 2b is a cross-sectional view taken along line A—A' of FIG. 2a.

Referring to FIGS. 2a and 2b, the reference numeral 5 indicates a front net made of wire netting. This front net has as its function removal of large size dust in the air. Also the net is grounded so as to enlarge the charging region. Reference numeral 6 is a cathode plate, 7 a supporting plate, 8 a discharge electrode provided on the supporting plate, and 9 an insulator. A number of the cathode plates 6 and the supporting plates 7 are arranged alternately and equidistantly with an interposition of the insulator 9 and as a whole these elements form an electrostatic dust collecting portion. All of the cathode plates 6 are connected together. Also all of the supporting plates 7 are connected together. However, the cathode plates and the supporting plates are mutually insulated.

Reference numeral 10 designates an ultraviolet ray sterilizing light irradiator, 11 and 11' are sockets, 12 is a deodorizing filter and 13 is a negative ion generator. Further a current source circuit 14 is provided so as to step up the 12 v.d.c. power obtained from the car mounting battery to produce outputs of 500 v.a.c. for use in the ultraviolet ray sterilizing light, +5 kv for the electrostatic dust collector, and −5 kv for use in the negative ion generator.

A fan 15 is provided and which is driven by a motor 16. Reference numeral 17 indicates a base plate.

Arrow 18 in FIG. 2b indicates an inlet air stream and arrow 19 indicates a purified outlet air stream.

The device shown in FIGS. 2a and 2b operates as follows. The intake air taken by the rotation of the fan 15 is at first filtered by the front net 5 to remove large size dust and then sent to the electrostatic dust collector portion. In the electrostatic dust collector portion, fine dust in the air is charged by corona discharge between the cathode plates 6 and the discharge electrodes 8 and then removed by electrostatic attractive force of the cathode plate 6.

Bacteria in the air are sterilized by the ultraviolet ray sterilizing light irradiator 10 and after deodorizing odor or smoke in the air by the deodorizing filter 12, negative ions are added to the air by the negative ion generator 13. The purified air in the above steps is forced out by the fan 15.

In the abovementioned air purifier, the current source circuit 14 comprises a high voltage generator portion for producing +5 kv for operating the electrostatic dust collector portion and −5 kv for operating the negative ion generator.

This high voltage generator portion of current source circuit 14 is constructed, for instance, as follows. The dc voltage of the car battery is converted into an ac voltage having a frequency on an order of several tens of kHz by using a transistorized oscillator. The above ac voltage is stepped up by using a transformer of a winding type or ceramic type and then rectified to produce positive and negative high voltages.

The above oscillation frequency on an order of several tens of kHz lies outside of the audible range of hearing. However, high frequency ripples necessarily accompanied by the oscillation are superposed on the output voltages and the higher harmonics of the ripples are irradiated outside through a wiring harness (not shown) or the like, which is functioning as the antenna. These higher harmonic components may be received by a car mounted antenna or the like and appear as noise in the received signals which may be, for example, television or radio signals. This phenomenon is quite unpleasant for the users.

The present invention removes such higher harmonic components of the ripples produced in the high voltage generator portion of the purifier.

FIG. 3a shows a circuit diagram according to one embodiment of the present invention to be used as the high voltage generator 14 of the current source circuit.

In FIG. 3a, $T_1$ is a step-up transformer, $Q_1$ is a transistor for interrupting the dc current, $D_1$ and $D_2$ are diodes for rectification, $R_1$ and $R_2$ are resistors, $P_1$ is an output terminal of $+5$ kv for operating electrostatic dust collector, $P_2$ is an output terminal of $-5$ kv for operating the negative ion generator and $P_3$ an output terminal common for both of the above.

When the current flowing through the primary winding $L_1$ of the transformer $T_1$ is interrupted at a frequency of several tens of kHz, a high voltage ac current is generated in the secondary winding $L_2$. This high voltage is rectified by the diode $D_1$ to produce a positive high voltage and is rectified by the diode $D_2$ to produce a negative high voltage. These high voltages are obtained at output terminals $P_1$ and $P_2$ respectively.

The resistors $R_1$ and $R_2$ are high value resistances for preventing noise according to the present invention. These resistors are selected in a range of several hundreds kΩ to several MΩ considering the output impedance and the voltage drop.

By inserting the above resistors $R_1$ and $R_2$, RC filters are formed together with stray capacities $C_1$ and $C_2$ existing at various portions of the high voltage generator portion. It is considered that these RC filters contribute to remove the noise components.

Figure 4A:
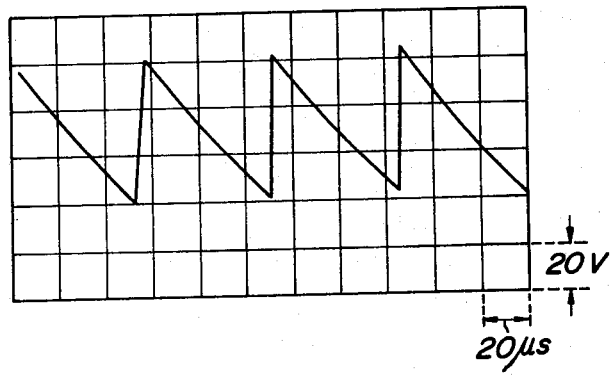
FIGS. 4a and 4b are diagrams showing the waveform of an irradiating noise voltage of the conventional device and compared to that of the present invention.
Figure 4B:
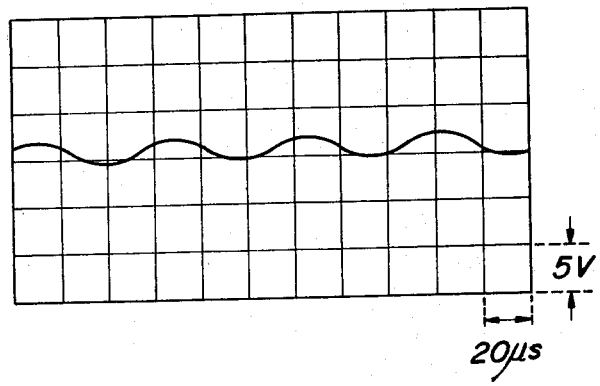

FIGS. 4a and 4b illustrate waveforms of the noise voltages viewed by an oscilloscope. FIG. 4a illustrates a noise waveform generated by a conventional device (without provision of resistors $R_1$ and $R_2$ in the circuit diagram of FIG. 3) and FIG. 4b illustrates an output voltage waveform of the device of the present invention.

In FIG. 4a, each division in the ordinate corresponds to 20 v and in FIG. 4b it corresponds to 5 v. The resistors $R_1$ and $R_2$ in this case are both 1 MΩ.

As can be seen from the above figures, especially from FIG. 4a, the output waveform of a conventional device is a sawtooth waveform. It is apparent that this waveform contains a lot of higher harmonics as can be proved by its Fourier transform.

In contrast thereto, the waveform of the output voltage of the device of the present invention is very close to a sinusoidal waveform and moreover the peak value is reduced about one thirtieth of the waveform of the conventional device so that the harmful higher harmonics are substantially suppressed.

Figure 5:
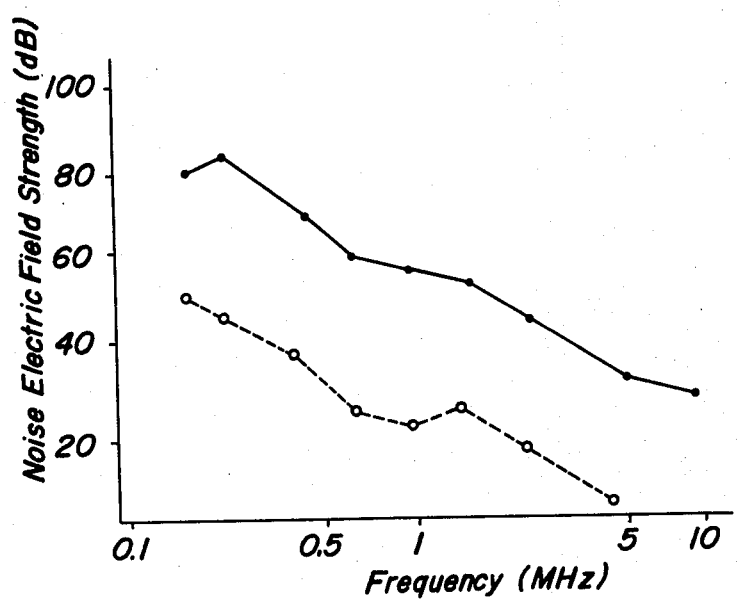
FIG. 5 is a diagram showing a comparison of electric field strength of the noise electric wave.

FIG. 5 is a graph showing for comparison the noise electric field strength vs frequency irradiated from the air purifier with respect to the device of the present invention and conventional one. In this figure, the solid line indicates field strength of the conventional device and the dotted line indicates that of the present invention.

As can be seen from the FIG. 5, according to the present invention approximately 35-40 dB (provided that 1 μV/m=0 dB) of improvement in the noise electric field strength can be achieved which may have a sufficient noise preventing effect.

Figure 6:
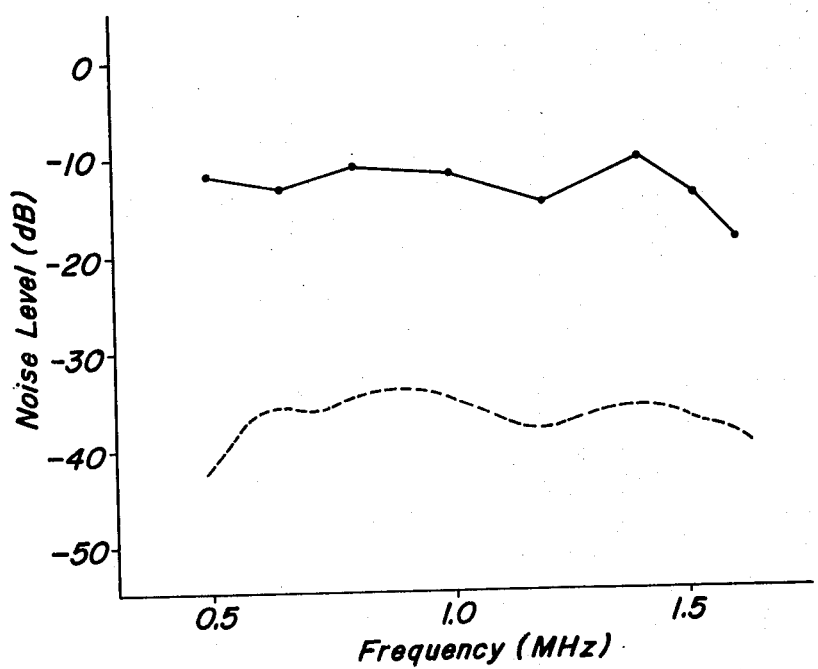
FIG. 6 shows a comparison of noise levels within a car radio.

FIG. 6 shows in comparison the amount of noise introduced in a car mounted radio in the device of the present invention and that of the conventional one. In the figure, the solid line indicates the noise level for a conventional device and the dotted line indicates set noise of the radio. Set noise corresponds to the noise level of the car radio itself when the air purifier is stopped or disconnected. The ordinate of this graph is the noise level, which is expressed by decibel (1 μV/m=0 dB) of the noise voltage induced across the speaker terminals of the car radio.

In case of the present invention, the generated noise level of the device is masked by the set noise of the car radio itself. This means that the noise level of the device is lower than the set level and it cannot be measured separately. Accordingly, in practice it can be said that production of noise by the air purifier can successfully be prevented by means of the present invention.

Figure 7:
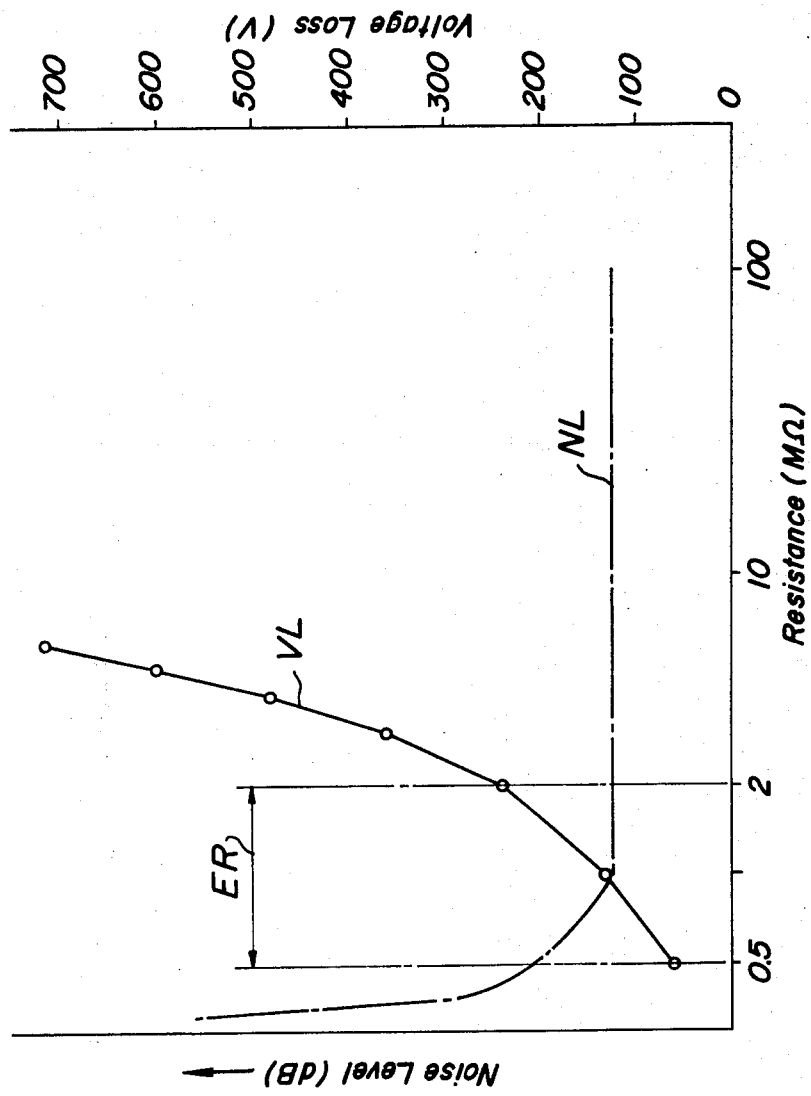
FIG. 7 is a diagram showing optimum range of the value of the resistance to be inserted.

We have further carried out number of experiments to determine an optimum range of the resistance to be used. FIG. 7 shows result of the experiments. In FIG. 7, an ordinate on righthand side shows voltage loss and the curve indicated by VL represents this voltage loss. The abscissa carries resistance value in MΩ. This means that if the resistance value is increased the voltage loss increases accordingly. Another ordinate on the lefthand side indicates the noise level in dB. The corresponding data are given by a curve NL. From this curve it can be said that the noise level decreases rather suddenly with an increase of the resistance value but it becomes somewhat constant at around a resistance of 2 MΩ or more. From both curves VL and NL, an effective range ER can be determined. The range ER of 500 kΩ to 2 MΩ has turned out to be most convenient judging from both the noise level and from the voltage loss.

Further it has been confirmed that resistance value of the above range may better be achieved by series connecting a number of resistances $R_{1a}$, $R_{1b}$, $R_{1c}$, etc. (see FIG. 3b) rather than by using a single resistor $R_1$ (FIG. 3a). This is considered to occur by reason of decreasing the parallel stray capacitance Cp by the series connection of the resistors and also by increasing stray capacitance Cg to ground.

In general, the high voltage generating portion contains certain amount of stray capacitance. Accordingly, even after switching off the main source of the air purifier, there is a danger of becoming shocked if one touches the dust collector portion. However, by inserting high resistances in the output circuit according to the present invention an additional advantage may be obtained in that shocking can be mitigated.

The resistors $R_1$ and $R_2$ shown in FIG. 3a may preferably be provided at a location closer to the output terminals $P_1$ and $P_2$ in view of obtaining a higher noise preventing effect.

As has been explained in the foregoing, according to the present invention a great advantage can be obtained in substantially preventing production of electromagnetic noise irradiated from the air purifier by a very simple means of inserting tandemly connected high resistances in the output circuit of the high voltage generator.

What is claimed is:

1. In an electrostatic type car air purifier having an air inlet and an air outlet comprising an electrostatic dust collector portion, a negative ion generator, and a high voltage generating portion having outputs for producing high voltages for operating respectively the dust collector portion and the negative ion generator, a system for reducing generation of electromagnetic noise from the high voltage generating portion comprising a high resistance means in series with rectifying diode means in the respective outputs of the high voltage generating portion, each of said high resistance means including a plurality of resistances connected in tandem to improve filtering by reduced stray capacitance across the resistance means and increased stray capacitance to a ground, wherein the resistance value of said high resistance means is between 500 k$\Omega$ and 2 M$\Omega$.

* * * * *